United States Patent [19]

Jones

[11] Patent Number: 5,076,189

[45] Date of Patent: Dec. 31, 1991

[54] TOWED VEHICLE HAVING AN EMERGENCY RELEASE

[76] Inventor: Leslie L. Jones, 12 Joe Nestor Rd., Tijeras, N. Mex. 87059

[21] Appl. No.: 572,383

[22] Filed: Aug. 27, 1990

[51] Int. Cl.$^5$ .................................................. B63B 21/56
[52] U.S. Cl. ...................................... 114/253; 441/65; 280/21.1
[58] Field of Search ............... 114/253, 144 R; 441/65, 441/68, 69, 73, 79; 280/14.3, 16, 21.1

[56] References Cited

U.S. PATENT DOCUMENTS

| | | | |
|---|---|---|---|
| 3,626,428 | 12/1971 | Collaro | 441/65 |
| 3,642,299 | 2/1972 | Garcia | 441/73 |
| 3,666,281 | 5/1972 | Billings | 280/15 |
| 3,803,653 | 4/1974 | Trostad | 114/253 |
| 4,082,304 | 4/1978 | Kendrena | 280/12 KL |
| 4,756,700 | 7/1988 | Coleman | 114/253 |
| 4,989,531 | 2/1991 | Humphrey | 441/65 |

*Primary Examiner*—Jesus D. Sotelo
*Assistant Examiner*—Stephen P. Avila
*Attorney, Agent, or Firm*—Terry M. Gernstein

[57] ABSTRACT

A towed vehicle includes a button actuated release for releasing the vehicle from a tow rope. The vehicle can be either a snow sled or a water sled, and the release can be automatic as well. The vehicles also include steering systems, and the manual release button is located in the steering element.

27 Claims, 6 Drawing Sheets

TOWED VEHICLE HAVING AN EMERGENCY RELEASE

Technical Field of the Invention

The present invention relates to the general art of vehicles, and to the particular field of towed vehicles.

Background of the Invention

The ever-increasing popularity of water and snow ski sports is well documented. The water sports include water skiing, kneeboarding and the like, while the snow sports include skiing, sledding and the like.

While these sports are extremely popular, there are many people who do not participate because they cannot or will not ski. Still others do not obtain full enjoyment of sledding since they do not wish to be towed.

One reason many people do not wish to be towed, either in a water sled or in a snow sled, is safety concerns. One concern is fear of having the sled roll over and continue to be pulled along by the towing vehicle. Such concerns may be inhibiting the full commercial acceptance of sledding vehicles.

One way to ameliorate this concern is to design vehicles that do not overturn. While this may be theoretically possible, it may not be a practical possibility, and still may not alleviate the concerns of such people.

Therefore, there is a need for a towed vehicle which can substantially eliminate the possibility of being towed in an upset configuration.

Another concern of many people is the difficulty of steering and controlling such towed vehicles. Therefore, there is a need for a towed vehicle that is easily steered and controlled. Such a vehicle may help to alleviate the fears of overturning as well as alleviating fears of not being able to control the vehicle.

OBJECTS OF THE INVENTION

It is a main object of the invention to provide a towed vehicle which can substantially eliminate the possibility of being towed in an upset configuration.

It is another object of the invention to provide a towed vehicle which can substantially eliminate the possibility of being towed in an upset configuration which is easily controlled and steered.

It is another object of the invention to provide a water or snow towed vehicle which can substantially eliminate the possibility of being towed in an upset configuration.

It is another object of the invention to provide a water or snow towed vehicle which can substantially eliminate the possibility of being towed in an upset configuration which is easily steered and controlled.

It is another object of the invention to provide a towed vehicle which can substantially eliminate the possibility of being towed in an upset configuration which includes an automatic release mechanism.

SUMMARY OF THE INVENTION

These, and other, objects are achieved by a towed vehicle which includes a tow rope quick-disconnect mechanism that includes a button positioned to be easily accessible to the driver. A quick push of the button releases the vehicle from the tow rope. The released vehicle can then coast to a stop or to a desired docking location. The button is located in the steering wheel to be readily accessible to the driver.

The vehicle also includes a mechanism for automatically releasing the tow rope should the vehicle roll about its longitudinal axis more than a predetermined amount. In this manner, should the vehicle driver panic or simply ignore the roll condition of the vehicle, the safety of the vehicle will still be ensured. A signal is also included to warn that a dangerous roll condition is being approached. This will permit a driver to take corrective action if possible, or to simply bail out if necessary.

DETAILED DESCRIPTION OF THE PREFERRED EMBODIMENT OF THE INVENTION

Figures 1, 4, 8, 9:
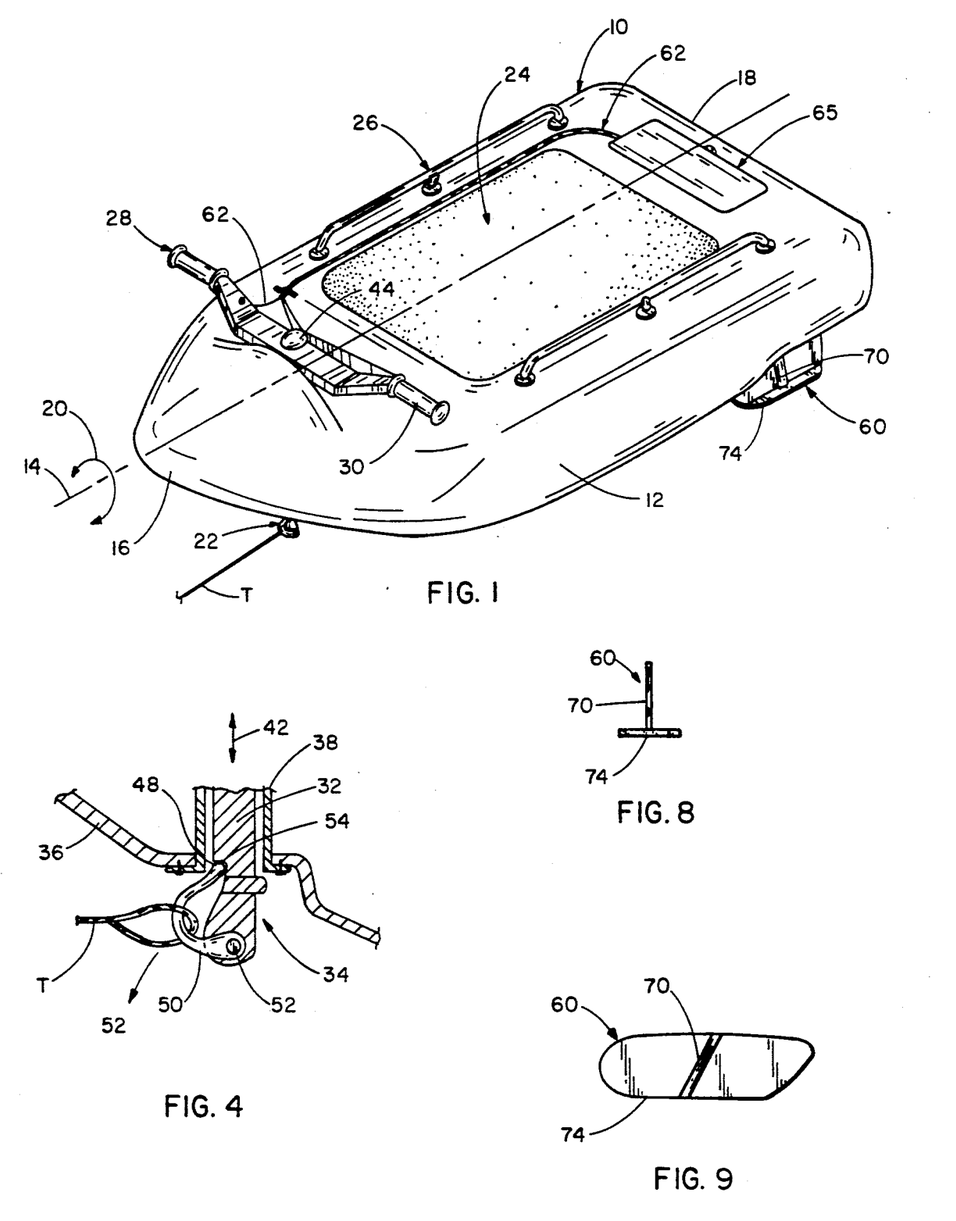
FIG. 1 is a perspective view of a towable water sled that embodies the present invention.
FIG. 4 is a partial schematic of a release mechanism used in a towed vehicle of the present invention.
FIG. 8 is an end elevational view of a rudder of the water sled shown in FIG. 1.
FIG. 9 is a side elevational view of a rudder of the water sled shown in FIG. 1.
Figure 2:
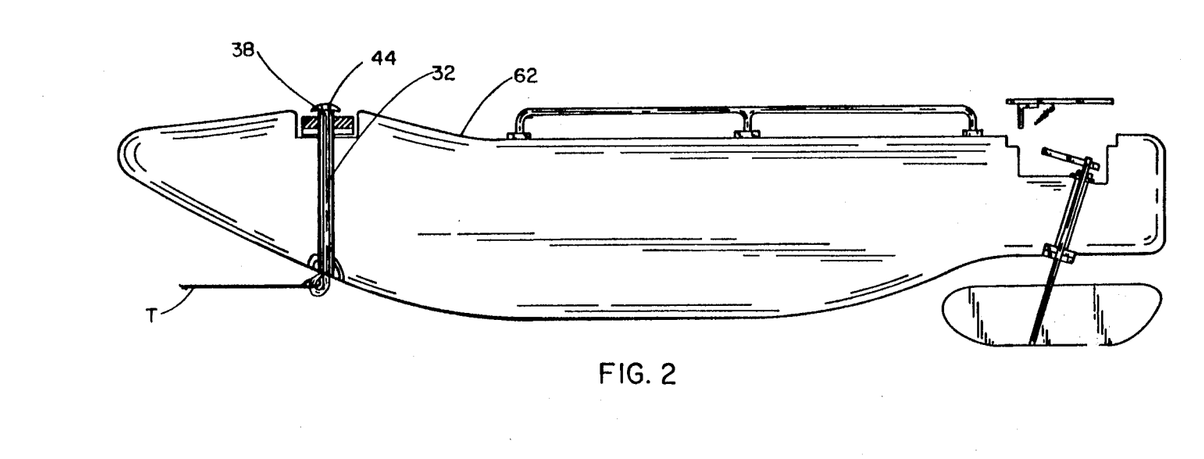
FIG. 2 is an elevation schematic of the water sled of FIG. 1.
Figure 3:
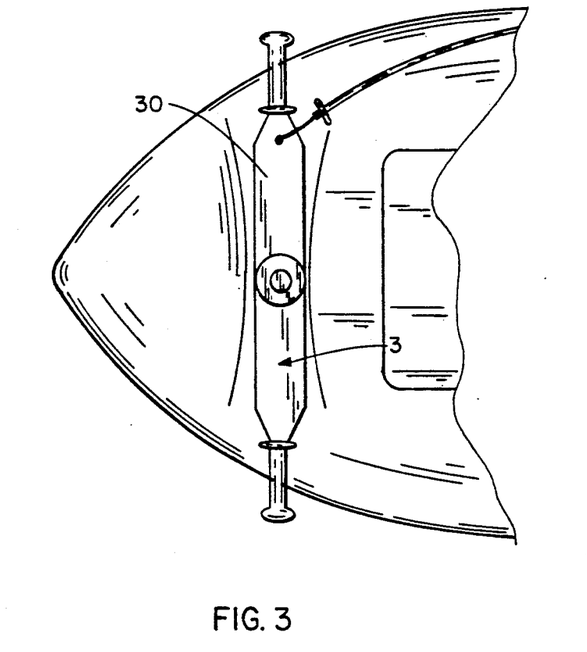
FIG. 3 is a schematic of a steering mechanism of the water sled shown in FIG. 1.

Shown in FIG. 1 is a water sled 10 embodying the present invention. The water sled 10 is adapted to be towed behind a motor boat and thus includes a body 12 made of suitable material such as fiberglass, closed cell foam, or the like. The body can also be formed by injection molding of plastic material with closed cell foam inside as suitable. The body 12 includes a longitudinal axis 14 that extends from the fore end 16 to the aft end 18 and about which the vehicle may roll in the direction indicated by double-headed arrow 20. The vehicle will upset from the normal condition shown in FIG. 1 if the amount of roll exceeds a certain angular amount. A figure of merit in this regard is 90°, and should the amount of roll exceed this amount, the vehicle is in danger of turning over.

Should the vehicle turn over, it should be disconnected from a towing vehicle (not shown) so that it can coast to a stop without endangering the occupants of the vehicle. Accordingly, the towed vehicles embodying the present invention include a quick-disconnect mechanism that will disconnect the vehicle, such as the water sled 10, from a tow rope T that is attached to the body at an anchor 22. As will be discussed below, the disconnection can be either automatically effected or manually effected. Once disconnected from the towing vehicle, the towed vehicle will be able to coast to a safe stop or to a dock under the momentum gained during the towing, but at a substantially reduced speed.

The release mechanism is located to be readily accessible to the vehicle driver who is located in the vehicle, in the case of the water sled 10, in occupant space 24 between rails 26 and behind steering assembly 28. The most likely location for an occupant of the vehicle who will be most able to effect a disconnection is behind the steering assembly, i.e., the driver. Accordingly, in the towed vehicles of the preferred embodiment, the release mechanism actuating means is located in the steering mechanism.

Figure 5:
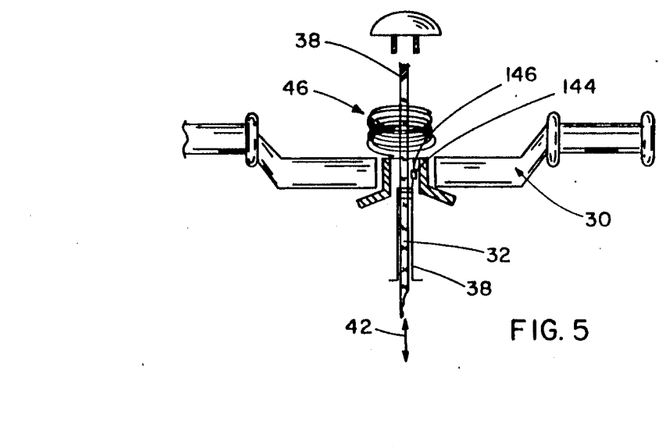
FIG. 5 is a partial schematic of a release mechanism used in a towed vehicle of the present invention.
Figure 6:
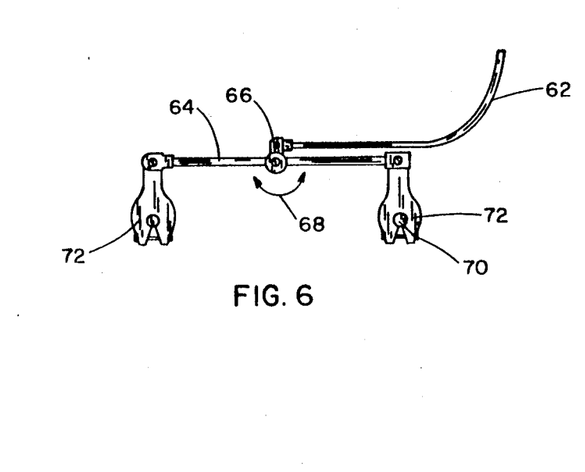
FIG. 6 is a partial schematic of a steering assembly of the water sled shown in FIG. 1.

The water sled 10 includes a steering element 30, and the quick-disconnect means releases the tow rope from engagement with the anchor 22, and is best shown in FIGS. 2-5. The quick-disconnect means includes a connecting rod 32 that extends from the steering wheel through the body in a generally vertical direction and has a lower end 34 which extends slightly outwardly of the bottom 36 of the vehicle. The connecting rod includes a top end 38 that extends slightly out of the steering element 30. A sleeve 40 is located in the body to guide the connecting rod that is adapted to move up and down as indicated in FIGS. 4 and 5 by double-headed arrow 42. A button 44 is mounted on top of the connecting rod so the rod can be manually moved downwardly, and a return spring 46 is seated against the button at one end thereof and against the steering element at the other end thereof so the rod will be automatically returned to an initial position after actuation of the disconnect mechanism.

As is best shown in FIG. 4, the lower end of the connecting rod includes a shoulder 48, and a trigger 50 is pivotally mounted on the lower end of this rod by a pivot pin 52. The tow rope T is connected to the trigger and thus the trigger acts as the aforementioned anchor when it is in the FIG. 4 configuration. As shown, the trigger has a distal end 54 seated in the rod shoulder 48 and bearing against that portion of the sleeve 38 that contacts the boat body 36. The tow rope T is tied to the trigger, and will be held when the trigger is in the FIG. 4 configuration trapped against the sleeve 38. However downward pull of the rope on the trigger will cause the trigger to release when that downward pull exceeds a predetermined amount.

The trigger can also be released by moving the connecting rod 32 downwardly from the FIG. 4 to release the trigger from engagement with the sleeve 32, and will permit that trigger to pivot in the direction indicated by arrow 52 thereby permitting the tow rope to slide off of the trigger and thus release the rope from the sled.

The spring 46 will return the connecting rod to the FIG. 4 and 5 condition. The tow rope is re-connected by moving the rod downwardly and tieing the rope to the trigger and then holding the rope in position while the trigger is placed in the FIG. 4 configuration.

Thus, using the release mechanism of the present invention, the driver of the vehicle can quickly disconnect that vehicle from the towing vehicle by simply depressing the button 44.

The water sled is steered by a steering assembly that is best shown in FIGS. 1, and 6-9 and which includes the steering element 30. The steering element 30 is connected to a pair of rudders, such as rudder 60 shown in FIG. 1 by a push-pull cable 62 that is connected at one end thereof to the steering element and at the other end thereof to a linkage 64. The rudders are located on each side of the longitudinal axis 14. The linkage is pivotally mounted on the aft end of the body by a pivot element 66 that causes the linkage to move in directions indicated by the double-headed arrow 68 when the steering element is rotated accordingly.

Figure 7:
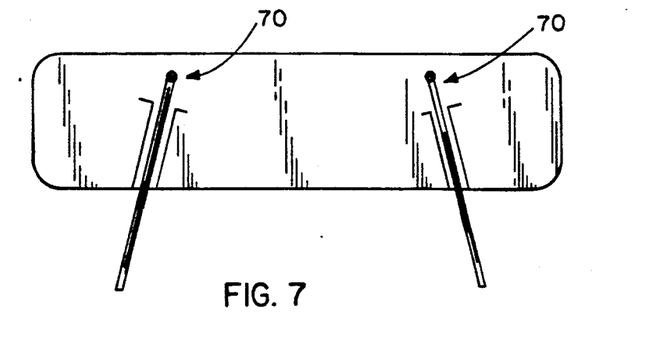
FIG. 7 is a partial schematic of a steering assembly of the water sled shown in FIG. 1.
Figure 10:
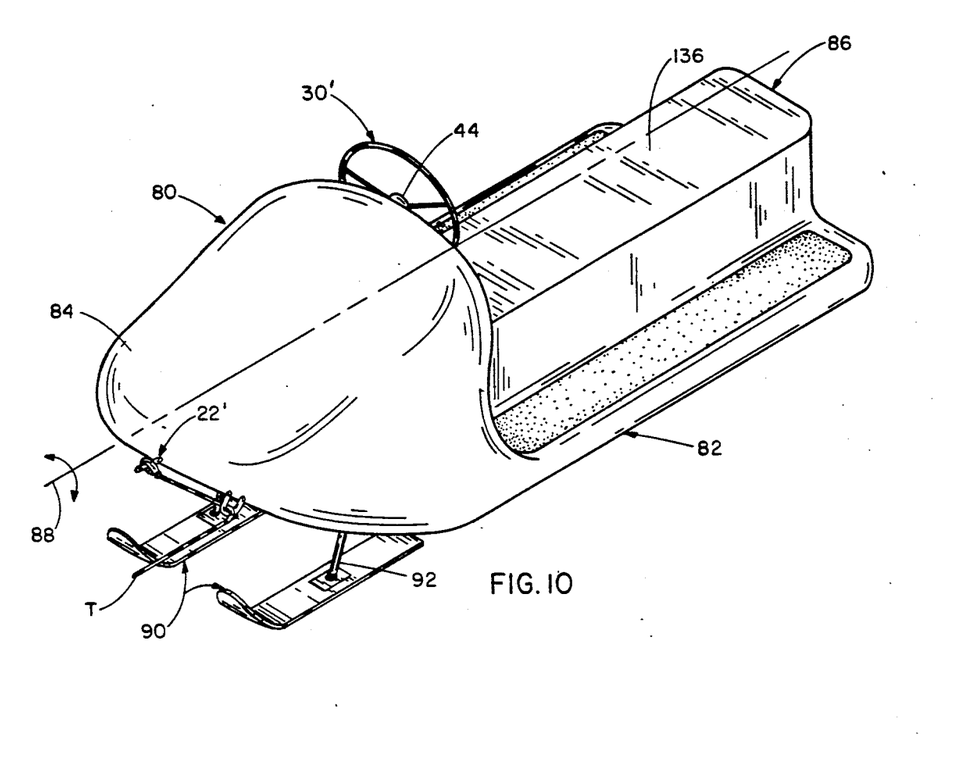
FIG. 10 is a perspective view of snow sled embodying the present invention.
Figure 11:
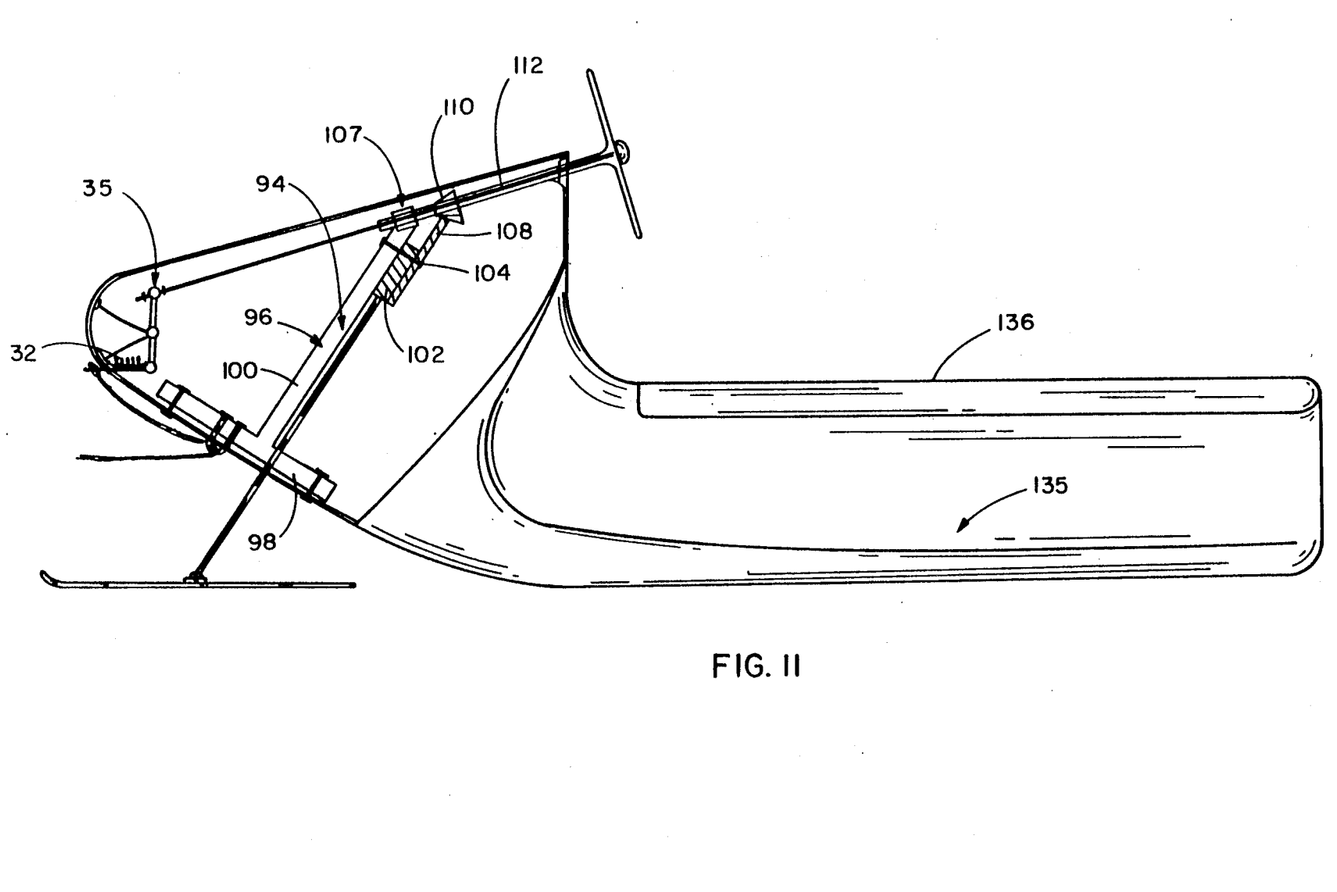
FIG. 11 is an elevation schematic of the snow sled of FIG. 10.
Figure 12:
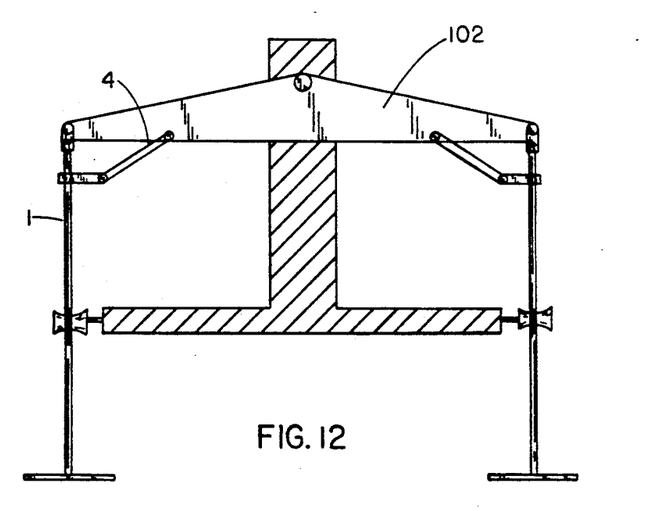
FIG. 12 is a partial schematic of a steering mechanism used in the snow sled of FIG. 10.

Each rudder includes a shaft 70 that is inclined forwardly of the vehicle at about a 15° angle and outwardly of the vehicle away from the centerline 14 at about the same angle as can be seen by comparing FIGS. 7 and 9. The linkage 64 is located in a well which is covered by a cover 65 connected to the shafts 70 by coupling elements 72 and causes those shafts to rotate in conjunction with the rotation of the linkage under the influence of the push-pull cable 62. Each rudder also includes a foot portion 74. Movement of the rudders will control the vehicle.

The quick-disconnect assembly of the present invention is also used in a snow sled 80 shown in FIGS. 10-14. The snow sled 80 includes a body 82 having a fore end 84 and an aft end 86 with a longitudinal axis 88 extending therethrough. The snow sled 80 is pulled in a manner similar to that of the just-discussed water sled using a tow rope T attached to the vehicle by an anchor 22'. The anchor 22' includes the same release mechanism as discussed above with an activating button 44 in the steering element 30. The tow rope will be released from a trigger upon downward pressure being applied to the button 44 in a manner identical to that described above. The only modification to the overall release mechanism is a result of the positioning of the steering wheel used on the snow sled. The above-discussed connecting rod 32 is operated by a linkage which includes a shaft S that is located near the steering shaft and is connected to the connecting rod 32 by a joint J and a lever L that is fixed to the body at a fulcrum F to reciprocate and move the connecting rod as above discussed to release the trigger. The biasing spring 46 serves the above-discussed function.

The steering assembly of the snow sled 80 includes two snow skis 90 attached to shafts 92 that extend forwardly and outwardly of the vehicle in the manner described above with regard to the rudder shafts 70. The skis are controlled to move upwardly to control the vehicle by a connecting assembly 94, best shown in FIGS. 11-14. The assembly 94 includes a frame 96 that includes a base 98 mounted on the inside surface of the vehicle body, and a mast 100 extending upwardly therefrom. A hook 101 is attached to the base 98 and the tow rope is passed through the hook 101 before being connected to the anchor means.

Figure 14:
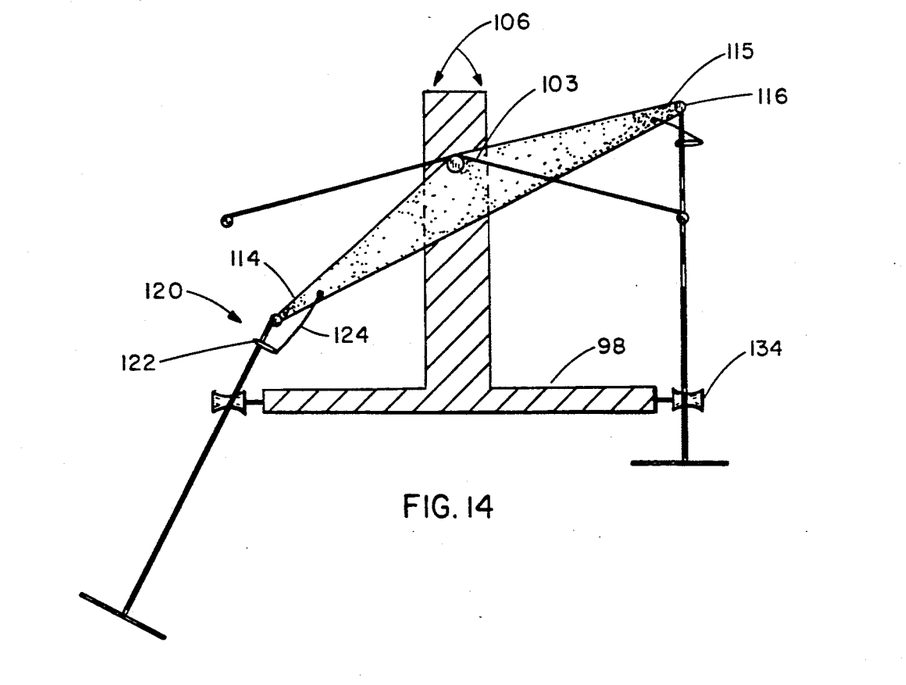
FIG. 14 is a partial schematic of a steering mechanism used in the snow sled of FIG. 10.

A triangular strut arm 102 is rotatably mounted at one of its apices 103 on the mast by a pivot element 104, and is controlled to move in the direction of the double-headed arrow 106 shown in FIG. 14 to move the shafts 92. The arm 102 is moved by means of gear set 107 which includes a gear 108 affixed thereto and meshingly engaged with a corresponding cone-shaped gear 110 affixed to a steering shaft 112 to be rotatable therewith. The cone-shaped gear 108 is a 60° cone in the preferred embodiment. Rotation of the steering wheel 30' rotates the shaft 112 which rotates the gear 108 via the gear 110 to move the ski shafts as indicated in FIG. 14.

Figure 13:
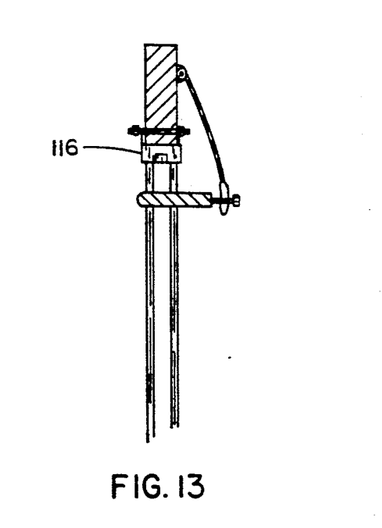
FIG. 13 is a partial schematic of a steering mechanism used in the snow sled of FIG. 10.

The shafts 92 are each connected to an apex 114 and 115 of the triangular strut arm 102 by connecting clip elements 116, and, as best shown in FIGS. 13 and 14, are guided by guide means 120 that include a ring 122 encircling the shaft and a tether 124 connecting the ring to the strut 102.

Further guiding and control of the ski struts 92 is provided by guide rollers 134 attached to the base 98. The rollers are elongated and concave to control movement of the struts 92.

The snow sled includes a running board 135, and a seat 136, and is formed of material suitable for use on a snow sled.

Figure 15:
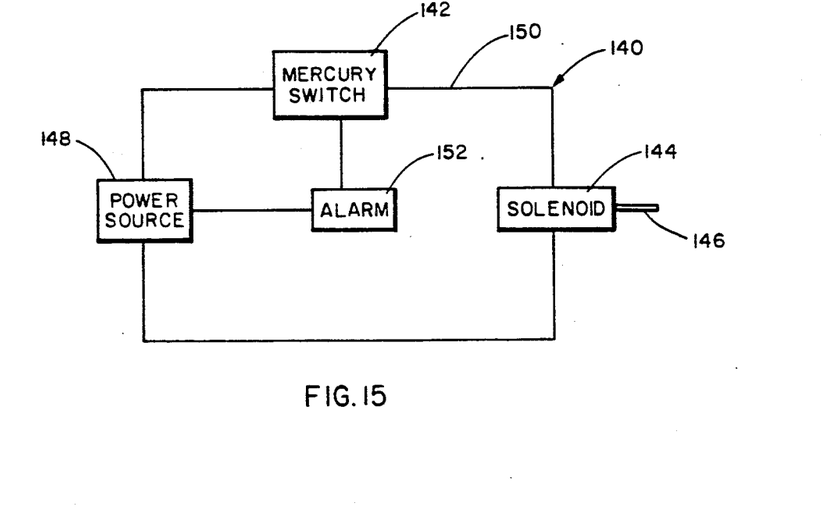
FIG. 15 is a schematic circuit diagram of an automatic warning and disconnection system used in the towed vehicles shown in FIG. 1 and FIG. 10.

The just-discussed means is used to manually release the tow rope from the vehicle. However, as above mentioned, should the driver panic, or simply ignore the continued roll of the vehicle, it may be wise to include an automatic means for releasing the tow rope. Such an automatic means is best shown in FIGS. 15 and 5, and attention is adverted thereto. As shown in FIG. 15, the automatic means includes a circuit 140 that has a roll position sensing switch, such as a mercury switch 142 mounted on the vehicle to sense roll thereof. The switch 142 is similar to the common mercury tilt switches used in the truck art, and thus will not be further discussed. The switch 142 is located near the center of gravity of the vehicle so the sensing of the roll is the most accurate, and is connected to a solenoid mechanism 144 having a solenoid controlled rod 146 that is extended upon power from power source 148 being applied thereto via the switch 142 and leads 150. The solenoid mechanism is also shown in FIG. 5 as being located to force the rod 32 downwardly in a trigger releasing direction upon actuation of the solenoid.

Thus, using the circuit 140, the tow rope can be automatically released from the vehicle upon that vehicle reaching a predetermined amount of roll. Since 90° is a very dangerous angle, upon reaching this angle, the mercury switch is closed to activate the automatic release mechanism. Other angles can be used without departing from the scope of the present invention.

The circuit 140 also includes a signal that warns the driver that a dangerous angle of roll is being approached. The signal includes an alarm 152 that is connected to the switch and to the power source to have the switch close the alarm circuit at a predetermined amount of roll that is less than that amount of roll used to activate the solenoid. For example, a roll of about 70° is used to activate the alarm 152 in order to give the driver sufficient time to take corrective action before the solenoid is activated to disconnect the tow rope from the vehicle. The alarm can be either audible or visible or both, and can be set to any suitable angle without departing from the scope of the present invention.

It is understood that while certain forms of the present invention have been illustrated and described herein, it is not to be limited to the specific forms or arrangements of parts described and shown.

I claim:

1. A towed vehicle comprising:
   A) a body in which a user sits;
   B) a steering mechanism on said body and which includes a hand-holdable steering element, guide means on said body and means connecting said steering element to said guide means;
   C) a towing rope connecting means on said body; and
   D) said towing rope connecting means including a tow rope quick-disconnect means for releasing said connecting means from a tow rope, said quick-disconnect means including an actuating button on said steering element, a trigger to which the tow rope is connected, a movable connecting rod connecting said trigger to said button, and a biasing means on said connecting rod, said trigger including a hook pivotally connected to said connecting rod and said quick-disconnect means includes an element located to engage said hook for capturing the tow rope, said button being located on one end of said connecting rod, said trigger being located on another end of said connecting rod.

2. The towed vehicle defined in claim 1 wherein said towed vehicle is a water sled.

3. The towed vehicle defined in claim 2 wherein said steering mechanism includes a rudder and a linkage connected to said steering element.

4. The towed vehicle defined in claim 3 wherein said rudder includes a shaft angled at about 15° transversely outward of said body and at about 15° towards the front of said body.

5. The towed vehicle defined in claim 4 wherein said steering mechanism includes tow rudders, one on each side of said body longitudinal axis.

6. The towed vehicle defined in claim 5 wherein said linkage includes a push-pull cord and a mounting link having each of its ends connected to one of said rudders.

7. The towed vehicle defined in claim 1 wherein said towed vehicle is a snow sled.

8. The towed vehicle defined in claim 7 wherein said steering mechanism includes skis mounted on said body.

9. The towed vehicle defined in claim 8 wherein said steering mechanism includes moving means for moving said skis with respect to said body.

10. The towed vehicle defined in claim 9 wherein moving means includes a connecting means connecting said steering element to said skis.

11. The towed vehicle defined in claim 10 wherein said connecting means includes a frame element mounted on said body.

12. The towed vehicle defined in claim 11 wherein said connecting means further includes a triangular strut arm connected at one apex to said frame element and a ski strut connected to each of the other apices of said triangular strut.

13. The towed vehicle defined in claim 12 wherein said connecting means further includes a gear set connecting said strut arm to said steering element.

14. The towed vehicle defined in claim 13 wherein said connecting means further includes elongated concave rollers mounted on said frame element to engage against each of said ski struts.

15. The towed vehicle defined in claim 14 wherein said connecting means further includes a clip element connecting each ski strut to said strut arm and permitting said each ski strut to swivel with respect to said strut arm.

16. The towed vehicle defined in claim 15 wherein said gear set includes a 60° cone-shaped gear connected to said steering element and a circular gear on said strut arm engaging said cone-shaped gear.

17. The towed vehicle defined in claim 10 further including a seat on said body.

18. The towed vehicle defined in claim 17 further including a running board on said body adjacent to said seat.

19. The towed vehicle defined in claim 11 further including a hook on said frame element through which the tow rope passes.

20. The towed vehicle defined in claim 1 wherein said quick-disconnect means further includes a vehicle roll-sensing means and means for disconnecting the tow rope from said connecting means when said body has a roll about a longitudinal axis that exceeds a predetermined amount.

21. The towed vehicle defined in claim 20 wherein said roll sensing means includes a mercury tilt switch.

22. The towed vehicle defined in claim 21 wherein said means for disconnecting the tow rope includes a solenoid actuated means connected to said tilt switch.

23. The towed vehicle defined in claim 22 wherein said mercury switch is located near the center of gravity of said body.

24. The towed vehicle defined in claim 23 wherein said predetermined amount of roll is about 90°.

25. The towed vehicle defined in claim 24 further including a warning system connected to said mercury switch.

26. The towed vehicle defined in claim 25 wherein said warning system includes an alarm which is actuated by said switch prior to activation of said solenoid actuated means.

27. The towed vehicle defined in claim 1 wherein said trigger is released by a downward pull of the tow rope on said trigger.

* * * * *